(12) United States Patent  (10) Patent No.: US 10,292,157 B2
Meng  (45) Date of Patent: May 14, 2019

(54) COMMUNICATION DEVICE AND BASE STATION

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 8 days.

(21) Appl. No.: 15/680,237

(22) Filed: Aug. 18, 2017

(65) Prior Publication Data

US 2018/0054819 A1 Feb. 22, 2018

Related U.S. Application Data

(60) Provisional application No. 62/376,926, filed on Aug. 19, 2016.

(51) Int. Cl.
  *H04W 72/04* (2009.01)
  *H04L 1/06* (2006.01)
  *H04L 1/18* (2006.01)

(52) U.S. Cl.
  CPC ....... *H04W 72/0446* (2013.01); *H04L 1/0625* (2013.01); *H04L 1/1822* (2013.01); *H04L 1/1835* (2013.01); *H04L 1/1874* (2013.01); *H04L 1/1887* (2013.01)

(58) Field of Classification Search
  CPC .. H04W 72/0446; H04W 4/22; H04W 76/023
  See application file for complete search history.

(56) References Cited

U.S. PATENT DOCUMENTS

| 2010/0290419 A1* | 11/2010 | Wengerter | ............ H04L 1/0027 370/329 |
| 2015/0181590 A1* | 6/2015 | Park | ...................... H04L 1/1812 370/280 |
| 2015/0296503 A1* | 10/2015 | Larsson | .............. H04W 72/048 370/329 |

(Continued)

FOREIGN PATENT DOCUMENTS

| WO | 02/30000 A2 | 4/2002 |
| WO | 2016114875 A1 | 7/2016 |
| WO | 2017136678 A1 | 8/2017 |

OTHER PUBLICATIONS

3GPP TSG RAN Meeting #72, "New Work Item on shortened TTI and processing time for LTE," Busan, Korea, RP-161299, p. 1-8, Jun. 2016.

(Continued)

*Primary Examiner* — Asad M Nawaz
*Assistant Examiner* — Syed Ali
(74) *Attorney, Agent, or Firm* — CKC & Partners Co., LLC

(57) ABSTRACT

A communication device configured to communicate with a network via at least one carrier is disclosed. The at least one carrier includes a plurality of transmission time interval (TTI) length configurations. The communication device includes a soft buffer for storing a downlink data transmission from the network; a storage unit configured to store a program code; and a processor electrically coupled to the storage unit. The processor is configured to access the program code to partition the soft buffer into a plurality of soft buffer partitions among the TTI length configurations according to a plurality of HARQ process numbers corresponding to the TTI length configurations.

11 Claims, 7 Drawing Sheets

(56) References Cited

U.S. PATENT DOCUMENTS

| | | | |
|---|---|---|---|
| 2015/0312371 A1* | 10/2015 | Han | H04W 4/70 370/281 |
| 2016/0029379 A1* | 1/2016 | Kuchibhotla | H04W 76/023 370/329 |
| 2016/0269213 A1* | 9/2016 | Larsson | H04L 1/1845 |
| 2016/0270055 A1* | 9/2016 | Larsson | H04L 1/0003 |
| 2017/0257864 A1* | 9/2017 | Kakishima | H04J 1/00 |
| 2017/0273071 A1* | 9/2017 | Nogami | H04W 72/0413 |
| 2017/0280447 A1* | 9/2017 | Uchino | H04W 4/00 |
| 2017/0338915 A1* | 11/2017 | Kim | H04L 1/1812 |
| 2017/0346606 A1* | 11/2017 | Li | H04L 1/1812 |
| 2018/0014301 A1* | 1/2018 | Chen | H04L 1/1812 |
| 2018/0220433 A1* | 8/2018 | Li | H04B 7/0452 |

OTHER PUBLICATIONS

3GPP TS 36.212, "Multiplexing and channel coding," Technical Specification, LTE Advanced, V12.5.0, p. 1-94, Jun. 2015.
3GPP TS 36.213, "Physical Layer Procedures," V12.5.0, Technical Specification, LTE Advanced, p. 1-239, Mar. 2015.
3GPP TS 36.306,"User Equipment (UE) radio access capabilities," V13.2.0, Technical Specification, LTE Advanced pro, p. 1-61, Jun. 2016.
Corresponding European search report dated Jan. 31, 2018.

\* cited by examiner

400 partitioning the soft buffer into soft buffer partitions among the TTI length configurations — S410

FIG. 4

COMMUNICATION DEVICE AND BASE STATION

RELATED APPLICATIONS

This application claims priority to U.S. Provisional Application Ser. No. 62/376,926, filed Aug. 19, 2016, which is herein incorporated by reference.

BACKGROUND

Technical Field

The present invention relates to a communication device and a base station. More particularly, the present invention relates to a communication device and a base station for partitioning a soft buffer unequally among the different transmission time interval (TTI) length configurations.

Description of Related Art

HARQ is an essential physical layer transmission technique in modern communication systems, where retransmissions are requested by the receiver by sending a HARQ feedback message in the case of decoding failure. The HARQ feedback message can be as simple as an acknowledgment/negative-acknowledgment (ACK/NACK) to signify whether the last decoding was successful or not. Upon receiving a HACK, the transmitter sends a retransmission, which is combined in some ways with failed previous transmissions to form a better judgment as there is still useful information embedded in previous failed transmissions.

To appropriately operate HARQ, the receiver has to be aware of the existence of a transmission in advance even if the transmission itself fails to be correctly decoded, so that the failed transmission can be retained and combined with the retransmissions later. In LTE/LTE-A, the enhanced NodeB (eNB) issues an explicit control message, a DL grant or an UL grant, to a user equipment (UE) for a DL transmission and an UL transmission, respectively. The UE thus expects a DL transmission in a predetermined time-frequency resource, and buffers the DL transmission if it fails decoding.

A soft buffer for storing soft channel bits is required at the UE to perform HARQ soft combining. Normally, the soft buffer at UE for storing soft channel bits is equally divided among the component carriers (CCs), and further divided among the transport blocks and HARQ processes. For a system supporting various transmission time interval (TTI) lengths concurrently, equally dividing the soft buffer among transport blocks and HARQ processes is neither desirable nor cost-effective.

Therefore, how to partition a soft buffer unequally among the different transmission time interval (TTI) length configurations, in order to reduce the cost, are problems to be improved in the field.

SUMMARY

An embodiment of this disclosure is to provide a communication device. The communication device is configured to communicate with a network via at least one carrier, in which the at least one carrier includes a plurality of transmission time interval (TTI) length configurations. The communication device includes a soft buffer for storing a downlink data transmission from the network; a storage unit configured to store a program code; and a processor electrically coupled to the storage unit. The processor is configured to access the program code to partition the soft buffer into a plurality of soft buffer partitions among the TTI length configurations according to a plurality of HARQ process numbers corresponding to the TTI length configurations.

An embodiment of this disclosure is to provide a communication device. The communication device is configured to communicate with a network via at least one carrier, wherein the at least one carrier includes a plurality of transmission time interval (TTI) length configurations, in which the communication device includes a soft buffer for storing a downlink data transmission from the network; a storage unit configured to store a program code; and a processor electrically coupled to the storage unit, wherein the processor is configured to access the program code to partition the soft buffer into a plurality of soft buffer partitions among the TTI length configurations according to a plurality of physical resource block (PRB) values corresponding to the TTI length configurations.

An embodiment of this disclosure is to provide a communication device. The communication device is configured to communicate with a network via at least one carrier, wherein the at least one carrier includes a plurality of transmission time interval (TTI) length configurations, in which the communication device includes a soft buffer for storing a downlink data transmission from the network; a storage unit configured to store a program code; and a processor electrically coupled to the storage unit, wherein the processor is configured to access the program code to partition the soft buffer into a plurality of soft buffer partitions among the TTI length configurations according to a plurality of maximum transport block size (TBS) values corresponding to the TTI length configurations.

Yet another embodiment of this disclosure is to provide a base station. The base station is configured to communicate with a communication device via at least one carrier, wherein the communication device comprising a soft buffer. The at least one carrier includes a plurality of transmission time interval (TTI) length configurations. The base station includes: a storage unit configured to store a program code; and a processor electrically coupled to the storage unit, wherein the processor is configured to access the program code to obtain a soft buffer size of the communication device and a corresponding TTI length configuration value for each of the TTI length configurations, calculate a partition size for each of the TTI length configurations according to the soft buffer size and the corresponding TTI length configuration value, and determine a circular buffer size for each of the TTI length configurations according to the partition size.

The embodiments of the present disclosure is to provide a communication device and a base station, and in particular, a communication device and a base station for a soft buffer unequally among the different transmission time interval (TTI) length configurations, in order to reduce the cost.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 4 is a flow chart of a communication method according to some embodiments of the present disclosure.

DETAILED DESCRIPTION

A soft buffer for storing soft channel bits is required at the user equipment (UE) to perform HARQ soft combining. The UE's total soft buffer size is specified as one of multiple properties of the UE category. The total soft buffer size is proportional to the maximum transport block size supported, and the carrier aggregation (CA) capability. The term soft buffer refers to the buffer used for storing total number of soft channel bits.

Figure 1:
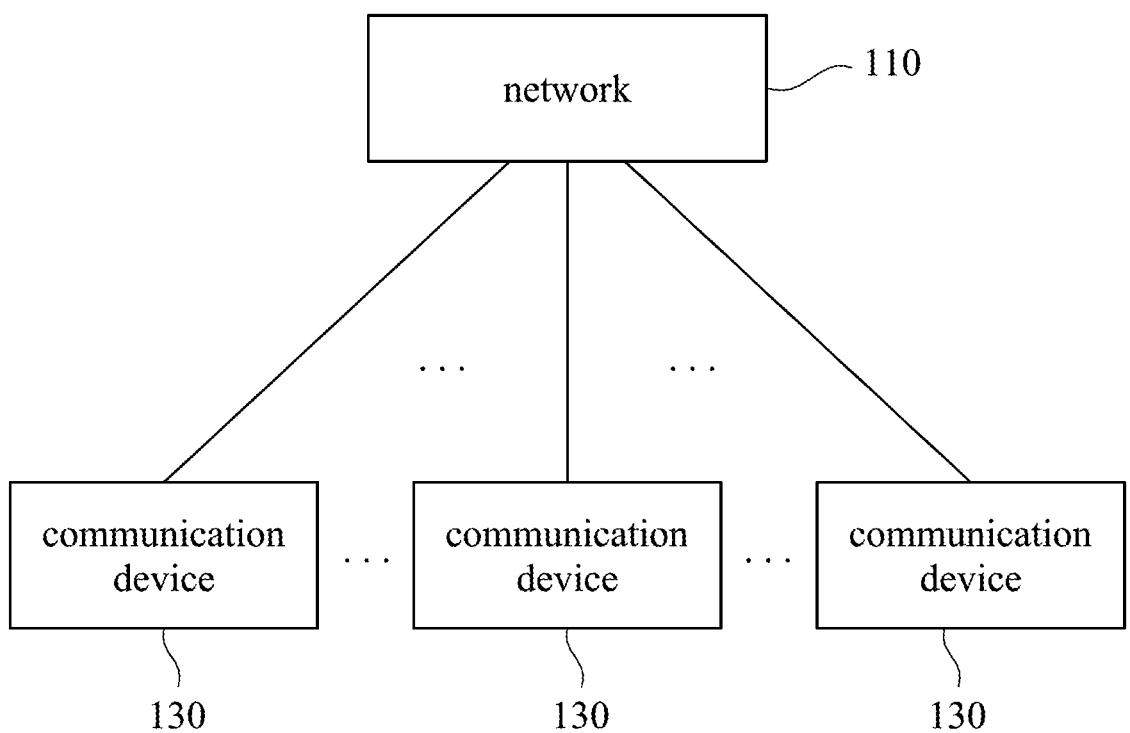
FIG. 1 is a schematic diagram of a wireless communication system according to some embodiments of the present disclosure.

FIG. 1 is a schematic diagram of a wireless communication system 100 according to some embodiments of the present disclosure. The wireless communication system 100 includes network 110 and several communication devices 130. The communication devices 130 may be user equipment (UE). The network 110 and the communication devices 130 may communicate with each other via one or more carriers of licensed band(s) and/or unlicensed band(s). In FIG. 1, the communication devices 130 and the network 110 are simply utilized for illustrating the structure of the wireless communication system 100, and the present disclosure is not limited thereto. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

The configured carriers between the network 110 and the communication devices 130 may include several different transmission time interval (TTI) length configurations. In some embodiments, the transmission time interval (TTI) length configurations may include a normal TTI and a shortened TTI. The TTI length configuration values among the TTI length configurations are different. The TTI length configuration values include but not limited to the number of codeblock, the number of MIMO (Multi-input Multi-output) transport blocks, the TTI length values, and the number of HARQ processes. In some embodiments, the TTI length configuration values are configured by the network.

Figure 2:
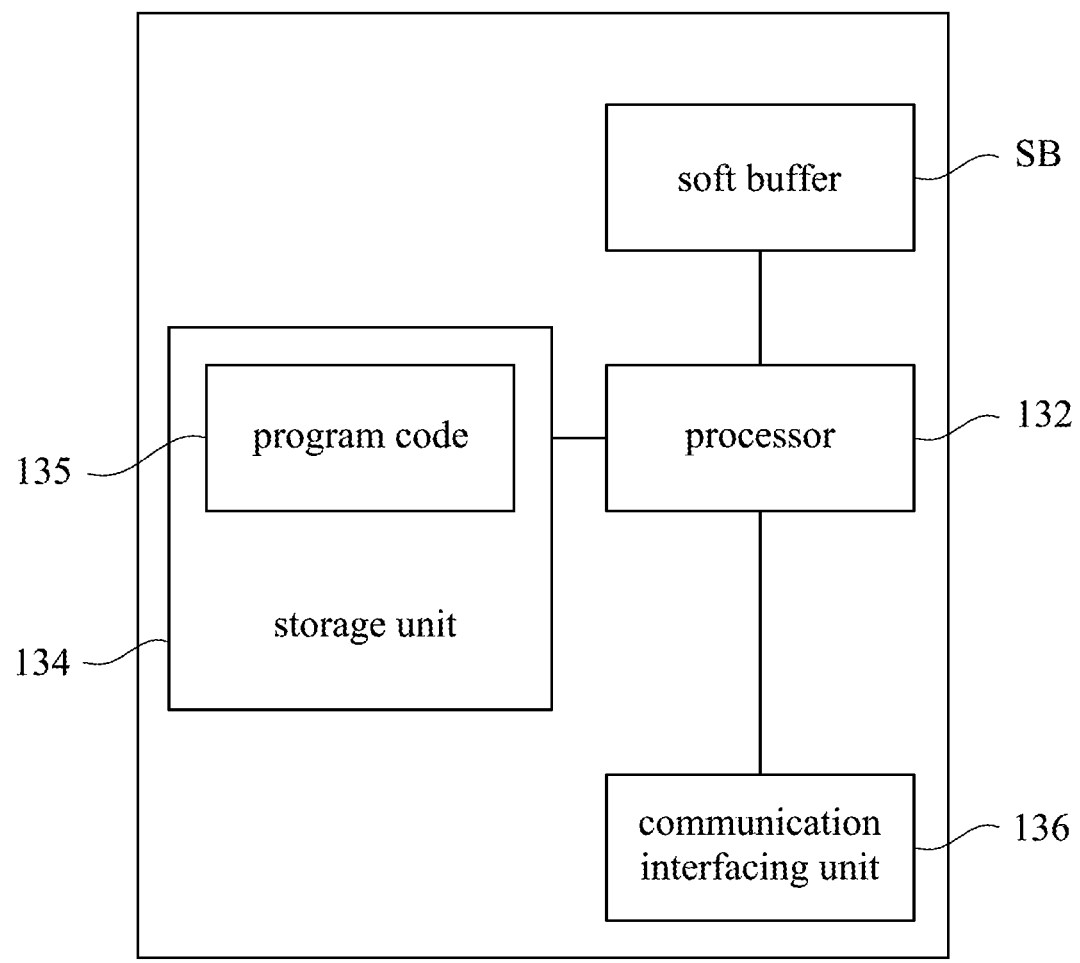
FIG. 2 is a schematic block diagram of a communication device according to some embodiments of the present disclosure.

Reference is made to FIG. 2. FIG. 2 is a schematic block diagram of a communication device 130 according to some embodiments of the present disclosure. The communication device 130 may include a processor 132, a storage unit 134, a soft buffer SB, and a communication interfacing unit 136. In some embodiments, the soft buffer SB is configured to store a downlink data transmission from the network 110. In some embodiments, the storage unit 134 stores a program code 135. The program code may be accessed by the processor 132 to perform several operations according to the program code 135. The communication interfacing unit 136 is configured to communicate with the network 110 according to the operation results of the processor 132. In some embodiments, the communication interfacing unit 136 may communicate with the network 110 by wireless signals.

Figure 3:
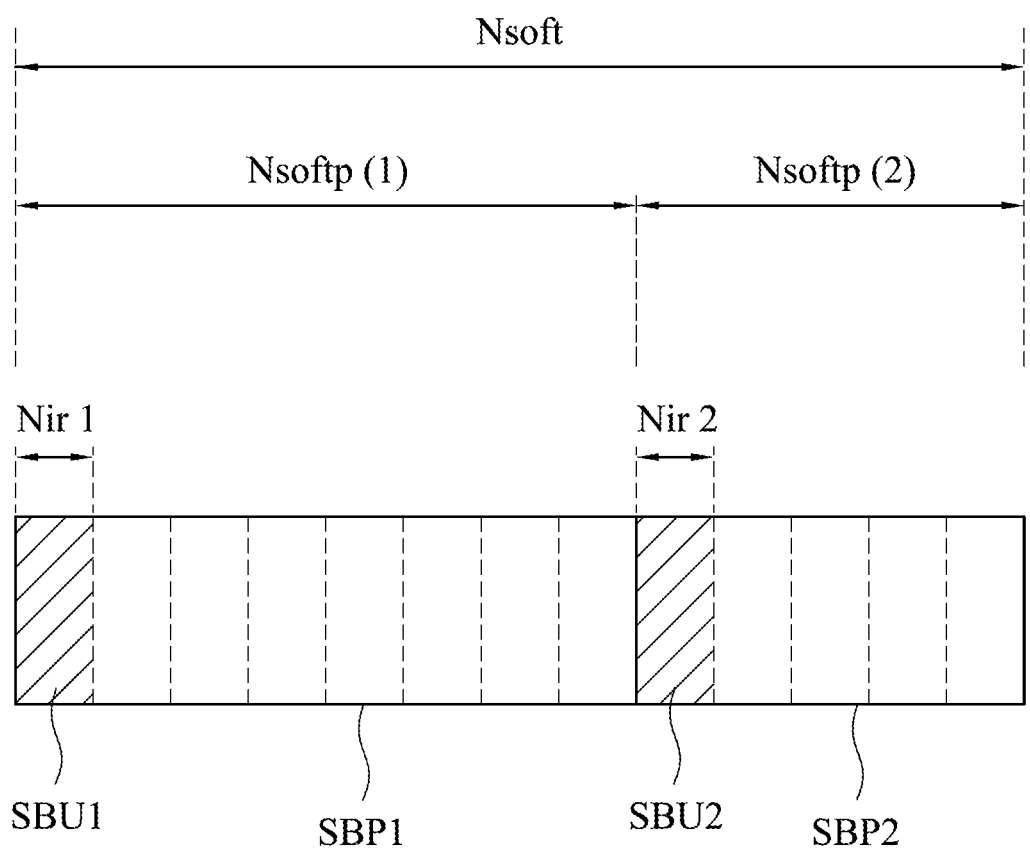
FIG. 3 is a schematic diagram of a soft buffer according to some embodiments of the present disclosure.

Reference is made to FIG. 3. FIG. 3 is a schematic diagram of a soft buffer SB according to some embodiments of the present disclosure. The soft buffer SB has a size of Nsoft.

Reference is made to FIG. 4. FIG. 4 is a flow chart of a communication method 400 according to some embodiments of the present disclosure. The communication method 400 includes operation S410. In some embodiments, the operation S410 may be performed by the processor 132 of FIG. 2.

S410: partitioning the soft buffer into a plurality of soft buffer partitions among the TTI length configurations.

For ease of explanation and understanding, reference is made to FIG. 2, FIG. 3, and FIG. 4.

In S410: partitioning the soft buffer into a plurality of soft buffer partitions among the TTI length configurations. The soft buffer size SB of the soft buffer SB is equal to the sum of the partition sizes Nsoftp of the soft buffer portions SBP. For example, assume K different TTI length configurations are configured; K>1. Let Nsoftp(k) denotes the partition size Nsoftp required for storing soft channel bits of TTI length configuration k, $\Sigma_{k=1}^{K}$ Nsoftp(k)=Nsoft.

As illustrated in FIG. 3, the soft buffer SB may be partitioned into soft buffer partitions SBP1 and SBP2. The soft buffer partition SBP1 has a size of Nsoftp(1), and the soft buffer partition SBP2 has a size of Nsoftp(2). The sum of the partition size Nsoftp of the soft buffer partitions SBP1 and SBP2 is equal to the soft buffer size Nsoft of the soft buffer SB. Each of the soft buffer partitions SBP1 and SBP2 corresponds to one of the TTI length configuration.

The proportions of the soft buffer partitions SBP among the different TTI length configurations may be determined by multiple factors, including but not limited to the TTI length, allocated frequency bandwidth, number of HARQ processes, and/or the maximum supported transport block size (TBS) of the TTI length configuration.

In some embodiments, the soft buffer SB is partitioned into soft buffer partitions SBP among the TTI length configurations according to a plurality of HARQ process numbers corresponding to the TTI length configurations.

For example, in some embodiments, operation S410 includes the following operations: for each of the TTI length configurations, calculating a corresponding proportion of a corresponding HARQ process number over a sum of the plurality of HARQ process numbers; and partitioning the soft buffer according to the corresponding proportion, such that each of the TTI length configurations corresponds to a corresponding soft buffer partition.

For example, let h(k) denotes the HARQ process number of TTI length configuration k. Mathematically the HARQ process number proportions may be calculated as the following equation, assuming a total of K TTI length configurations are configured:

$$HARQ \text{ process number proportion} = \frac{h(k)}{\sum_{k=1}^{K} h(k)}.$$

h(k) denotes the HARQ process number of TTI length configuration k; and $$\sum_{k=1}^{K} h(k)$$

denotes the sum of the HARQ process numbers of the TTI length configurations.

For example, assume configuration 1 is the shortened TTI, and configuration 2 is the normal TTI, and K=2. If the shortened TTI with HARQ process number of 3 and the normal TTI with HARQ process number of 8 are configured. That is, h(1)=3 and h(2)=8 The HARQ process number proportion of the shortened TTI length configuration is $$\frac{3}{3+8},$$

and the HARQ process number proportion of the normal TTI length configuration is $$\frac{8}{3+8}.$$

Note that the HARQ process number for h(k) are for illustrative purposes only and the present disclosure is not limited thereto, as long as the unit of measurement is consistent.

The soft buffer SB is then partitioned among different TTI length configurations in a proportion to the respective HARQ process numbers. The partition sizes Nsoftp are in a proportion to the HARQ process numbers respectively, as the following equation:

$$\frac{Nsoftp(k)}{Nsoft} = \frac{h(k)}{\sum_{k=1}^{K} h(k)}.$$

Nsoftp(k) denotes the partition size Nsoftp required for storing soft channel bits of TTI length configuration k; Nsoft denotes the minimum soft buffer size Nsoft required for storing soft channel bits for a carrier at the UE or the carrier between the communication device 130 and internet 110; h(k) denotes the HARQ process number of TTI length configuration k; and $\Sigma_{k=1}^{K}$ h(k) denotes the sum of the HARQ process numbers of the TTI length configurations.

In some embodiments, in the event that the soft buffer partitions do not have an integer during partitioning, a certain rule for rounding may be specified. For example, rounding down to the nearest integer, or rounding up to the nearest integer for all k except k=1.

For example, if the soft buffer size Nsoft is obtained from the specification of the communication device 130 as 3667200, assuming configuration 1 is the shortened TTI, and configuration 2 is the normal TTI, and K=2. If the shortened TTI with HARQ process number of 3 and the normal TTI with HARQ process number of 8 are configured. That is, h(1)=3 and h(2)=8. The rule of rounding up to the nearest integer for all k except k=1 is adopted. According to the HARQ process number proportions, the soft buffer partition size Nsoftp of shortened $$\frac{3}{3+8} \times 3667200 = 1000145,$$

TTI is and the soft buffer partition size Nsoftp of normal TTI is $$\frac{8}{3+8} \times 3667200 = 2667055.$$

In some embodiments, for each of the TTI length configurations, the processor 132 is further configured to partition the corresponding soft buffer partitions SBP equally among the corresponding HARQ value.

In some embodiments, the processor 132 is further configured to partition the corresponding soft buffer partitions SBP equally among a plurality of corresponding codeblock values, and/or a plurality of corresponding MIMO transport block values.

As shown in FIG. 3, the soft buffer partition SBP1 may be further partitioned into several soft buffer units SBU1, and the soft buffer partition SBP2 may be further partitioned into several soft buffer units SBU2. Each of the soft buffer units SBU1 has a soft buffer unit size of Nir 1, and each of the soft buffer units SBU2 has a soft buffer unit size of Nir 2.

In some other embodiments, in operation S410, the soft buffer SB is partitioned into soft buffer partitions SBP among the TTI length configurations according to a plurality of physical resource block (PRB) values corresponding to the TTI length configurations.

For example, in some embodiments, operation S410 includes the following operations: for each of the TTI length configurations, calculating a corresponding proportion of a corresponding PRB value over a sum of the plurality of PRB values; and partitioning the soft buffer according to the corresponding proportion, such that each of the TTI length configurations corresponds to a corresponding soft buffer partition.

In some embodiments, the PRB value proportions are calculated according to the configured bandwidth values and the TTI length values. In some embodiments, the PRB value proportions are calculated by multiplying the configured bandwidth values and the TTI length values. For example, let l(k) denotes the TTI length value of TTI length configuration k, and b(k) denotes the configured bandwidth value for TTI length configuration k. Mathematically the PRB value proportions may be calculated as the following equation, assuming a total of K TTI length configurations are configured:

$$PRB \text{ value proportion} = \frac{l(k)b(k)}{\sum_{k=1}^{K} l(k)b(k)}.$$

l(k)b(k) denotes the PRB value of the TTI length configuration k; $\Sigma_{k=1}^{K}$ l(k)b(k) denotes the sum of the PRB values of the TTI length configurations.

For example, assume configuration 1 is the shortened TTI, and configuration 2 is the normal TTI, and K=2. If the shortened TTI with TTI length of 2 OFDM symbols and the normal TTI with TTI length of 14 OFDM symbols are configured, l(1)=2 and l(2)=14. If the shortened TTI with a configured frequency bandwidth of 35 PRBs and the normal TTI with a configured frequency bandwidth 75 PRBs are configured, b(1)=35 and b(2)=75. The PRB value proportion of the shortened TTI length configuration is $$\frac{2\times 35}{2\times 35 + 14\times 75},$$

and the PRB value proportion of the normal TTI length configuration is $$\frac{14\times 75}{2\times 35 + 14\times 75}.$$

Note that the TTI length value and the configured bandwidth value mentioned above are for illustrative purposes only and the present disclosure is not limited thereto, as long as the unit of measurement is consistent.

The soft buffer SB is then partitioned among different TTI length configurations in a proportion to the respective PRB values. The partition sizes Nsoftp are in a proportion to the PRB values respectively, as the following equation:

$$\frac{Nsoftp(k)}{Nsoft} = \frac{l(k)b(k)}{\sum_{k=1}^{K} l(k)b(k)}.$$

Nsoftp(k) denotes the partition size required for storing soft channel bits of the TTI length configuration k; Nsoft denotes the minimum soft buffer size required for storing soft channel bits for a carrier at the UE or the carrier between the communication device 130 and internet 110; l(k)b(k) denotes the PRB value of the TTI length configuration k; and $\Sigma_{k=1}^{K}$ l(k)b(k) denotes the sum of the PRB values of the TTI length configurations.

For example, if the soft buffer size Nsoft is obtained from the specification of the communication device 130 as 3667200, assuming configuration 1 is the shortened TTI, and configuration 2 is the normal TTI, and K=2. A shortened TTI with TTI length of 2 OFDM symbols and a configured bandwidth of 35 PRBs, and a normal TTI with TTI length of 14 OFDM symbols and a configured bandwidth of 75 PRBs are configured. According to the PRB value proportions, the soft buffer partition size Nsoftp for the shortened TTI is $$\frac{2\times 35}{2\times 35 + 14\times 75} \times 3667200 = 229200,$$

and the soft buffer partition size Nsoftp for the normal TTI is $$\frac{14\times 75}{2\times 35 + 14\times 75} \times 3667200 = 3438000.$$

In some embodiments, for each of the TTI length configurations, the processor 132 is further configured to partition the corresponding soft buffer partitions SBP equally among the corresponding PRB value.

In some embodiments, the processor 132 is further configured to partition the corresponding soft buffer partitions SBP equally among a plurality of corresponding codeblock values, and/or a plurality of corresponding MIMO transport block values.

As shown in FIG. 3, the soft buffer partition SBP1 may be further partitioned into several soft buffer units SBU1, and the soft buffer partition SBP2 may be further partitioned into several soft buffer units SBU2. Each of the soft buffer units SBU1 has a soft buffer unit size of Nir 1, and each of the soft buffer units SBU2 has a soft buffer unit size of Nir 2.

In some other embodiments, in operation S410, the soft buffer SB is partitioned into soft buffer partitions SBP among the TTI length configurations according to a plurality of maximum transport block size (TBS) values corresponding to the TTI length configurations.

For example, in some embodiments, operation S410 includes the following operations: for each of the TTI length configurations, calculating a corresponding proportion of a corresponding maximum transport block size (TBS) value over a sum of the plurality of maximum transport block size (TBS) values; and partitioning the soft buffer according to the corresponding proportion, such that each of the TTI length configurations corresponds to a corresponding soft buffer partition.

For example, let TBS(k) denotes the maximum supported downlink (DL) TBS for TTI length configuration k. Mathematically the TBS value proportions may be calculated as the following equation:

$$TBS \text{ value proportion} = \frac{TBS(k)}{\sum_{k=1}^{K} TBS(K)}.$$

TBS(k) denotes the maximum supported downlink (DL) TBS for TTI length configuration k; and $\Sigma_{k=1}^{K}$ TBS(k) denotes the sum of the TBS values of all the information with different TTI length configurations.

For example, assume configuration 1 is the shortened TTI, and configuration 2 is the normal TTI, and K=2. If the shortened TTI with TBS value of 21384 and the normal TTI with TBS value of 149776 are configured. That is, TBS(1)=21384 and TBS(2)=149776, the TBS value proportion of the shortened TTI length configuration is $$\frac{21384}{21384 + 149776},$$

and the TBS value proportion of the normal TTI length configuration is $$\frac{149776}{21384 + 149776}.$$

The soft buffer is then partitioned among different TTI length configurations in a proportion to the respective TBS values. The partition sizes are in a proportion to the TTI length configuration values respectively, as the following equation:

$$\frac{Nsoftp(k)}{Nsoft} = \frac{TBS(k)}{\sum_{k=1}^{K} TBS(k)}.$$

Nsoftp(k) denotes the partition size Nsoftp required for storing soft channel bits of TTI length configuration k; Nsoft denotes the minimum soft buffer size Nsoft required for storing soft channel bits for a carrier at the UE or the carrier between the communication device 130 and internet 110; TBS(k) denotes the maximum supported downlink (DL) TBS for TTI length configuration k; and $\Sigma_{k=1}^{K}$ TBS(k) denotes the sum of the TBS values of the TTI length configurations.

For example, if the soft buffer size Nsoft is obtained from the specification of the communication device 130 as 3667200, assuming configuration 1 is the shortened TTI, and configuration 2 is the normal TTI, and K=2. The shortened TTI with TBS value of 21384 and a normal TTI with TBS value of 149776 are configured. According to the TTI value proportions, the soft buffer partition size Nsoftp of shortened TTI is $$\frac{21384}{21384+149776} \times 3765520 = 470448,$$

and the soft buffer partition size Nsoftp of normal ITT is $$\frac{149776}{21384+149776} \times 3765520 = 3295072.$$

In some embodiments, for each of the TTI length configurations, the processor 132 is further configured to partition the corresponding soft buffer partitions SBP equally among the corresponding maximum transport block size (TBS) value.

In some embodiments, the processor 132 is further configured to partition the corresponding soft buffer partitions SBP equally among a plurality of corresponding codeblock values, and/or a plurality of corresponding MIMO transport block values.

As shown in FIG. 3, the soft buffer partition SBP1 may be further partitioned into several soft buffer units SBU1, and the soft buffer partition SBP2 may be further partitioned into several soft buffer units SBU2. Each of the soft buffer units SBU1 has a soft buffer unit size of Nir 1, and each of the soft buffer units SBU2 has a soft buffer unit size of Nir 2.

For example, assume only a normal TTI is configured. The soft buffer SB may be divided into at least one soft buffer SB according to the number of downlink carriers. Since only a normal TTI is configured, the soft buffer SB needs not to be partitioned among the TTI configurations. The size Nsoftp soft buffer partition SBP of the normal carrier and the size Nsoft of the soft buffer SB are the same. The soft buffer partition SBP may be further partitioned into several soft buffer units SBU among the codeblock values, the MIMO transport block values, and the HARQ process numbers.

Mathematically, the soft buffer unit size Nir of the soft buffer unit when only a normal TTI is configured may be as the following equation:

$$Nir = \left\lfloor \frac{Nsoft}{C \cdot NcellsDL \cdot KMIMO \cdot \min(MDLHARQ, Mlimit)} \right\rfloor.$$

Nir denotes the soft buffer unit size of the soft buffer unit SBU; Nsoft denotes the soft buffer size Nsoft of the soft buffer SB; C denotes the codeblock value; NcellsDL denotes the number of downlink carriers; KA/HMO denotes MIMO transport block values; MDLHARQ denotes the HARQ process numbers; and Mlimit denotes a limit value.

For another example, assume a shortened TTI and a normal TTI are configured. Configuration 1 is the shortened TTI, and configuration 2 is the normal TTI. The soft buffer SB may be divided into at least one soft buffer SB according to the number of downlink carriers. The soft buffer SB may be partitioned into soft buffer partitions SBP1 and SBP2 according to the TTI length configuration values, as mentioning above. The soft buffer partitions SBP1 and SBP2 may be further partitioned into several soft buffer units SBU1 and SBU2, respectively, among the codeblock values, the MIMO transport block values, and the HARQ process numbers.

Mathematically, the soft buffer unit size Nir of the soft buffer unit when only a normal TTI is configured may be as the following equation:

$$Nir = \left\lfloor \frac{Nsoft}{C \cdot NcellsDL \cdot KMIMO \cdot \min(MDLHARQ, Mlimit)} \times \frac{Nsoftp(k)}{Nsoft} \right\rfloor.$$

Nir denotes the soft buffer unit size of the soft buffer unit SBU; Nsoft denotes the soft buffer size Nsoft of the soft buffer SB; C denotes the codeblock value; NcellsDL denotes the number of downlink carriers; KMIMO denotes MIMO transport block values; MDLHARQ denotes the HARQ process numbers; and Mlimit denotes a limit value: Nsoft denotes the soft buffer size of the soft buffer SB; k=1 or 2 depending on the TTI length configuration; and $$\frac{Nsoftp(k)}{Nsoft}$$

may be obtained as above-mentioned.

When multiple TTI length configurations are configured, the communication device 130 determines the soft buffer partition size Nsoftp for storing soft channel bits for each TTI length configuration using the unequal partition method previously described on a given soft buffer size Nsoft, which may be specified in the specification. The communication device 130 further determines the soft buffer unit size for a codeblock with a configured number of MIMO transport blocks, and a number of specified HARQ processes within the soft buffer partitioned for a particular TTI length configuration using an equal partition method.

Note that the proportion values calculated according to other combinations of TTI length value, frequency bandwidth value, number of HARQ processes, and/or maximum supported TBS for partitioning the soft buffer are not precluded. For example, the soft buffer may be partitioned into soft buffer partitions with partition sizes in a proportion to the product of TTI length, bandwidth, and number of HARQ processes, or in a proportion to the product of number of HARQ processes and maximum supported TBS. The principle remains the same, and similar rules can be obtained following the teachings described above.

Figure 5:
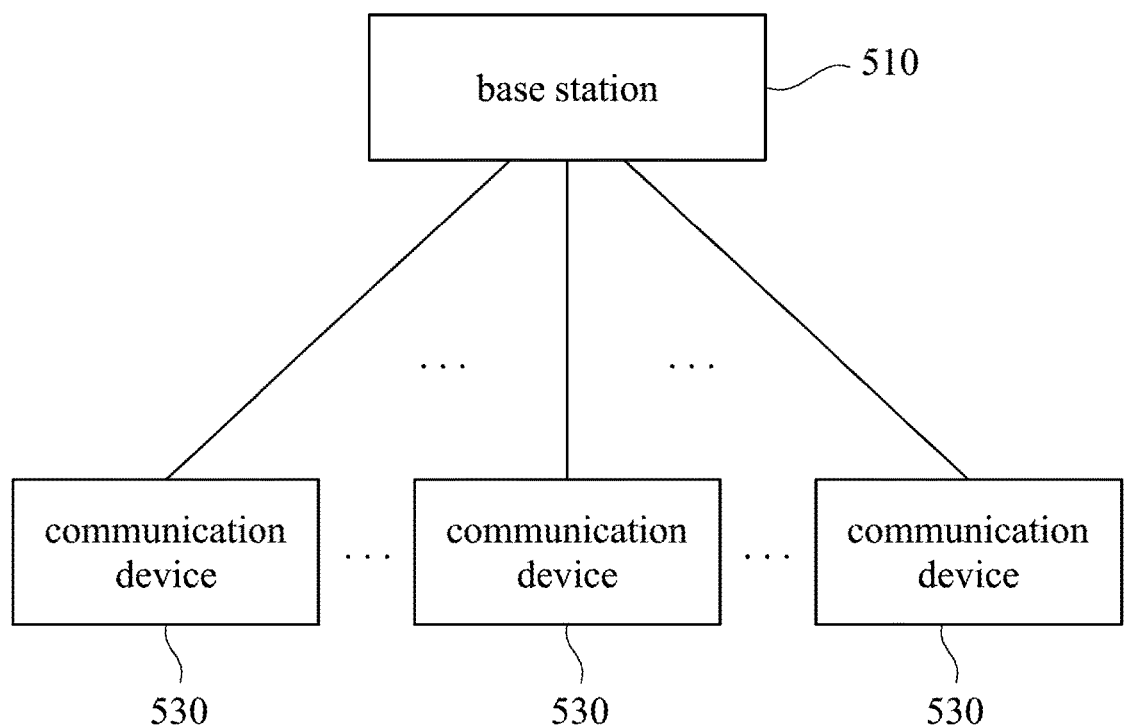
FIG. 5 is a schematic diagram of a wireless communication system according to some embodiments of the present disclosure.

Reference is made to FIG. 5. FIG. 5 is a schematic diagram of a wireless communication system 500 according to some embodiments of the present disclosure. The wireless communication system 500 includes base station 510 and several communication devices 530. The communication devices 530 may be user equipment (UE). The base station 510 and the communication devices 530 may communicate with each other via one or more carriers of licensed band(s) and/or unlicensed band(s). In FIG. 1, the base station 510 and several communication devices 530 are simply utilized for illustrating the structure of the wireless communication system 500, and the present disclosure is not limited thereto.

The configured carriers between the network 510 and the communication devices 530 may include several different transmission time interval (TTI) length configurations. In some embodiments, the transmission time interval (TTI) length configurations may include a normal TTI and a shortened TTI. The TTI length configuration values among the TTI length configurations are different. The TTI length configuration values include but not limited to the number of codeblock, the number of MIMO transport blocks, the TTI length values, and the number of HARQ processes. In some embodiments, the TTI length configuration values are configured by the network.

Figure 6:
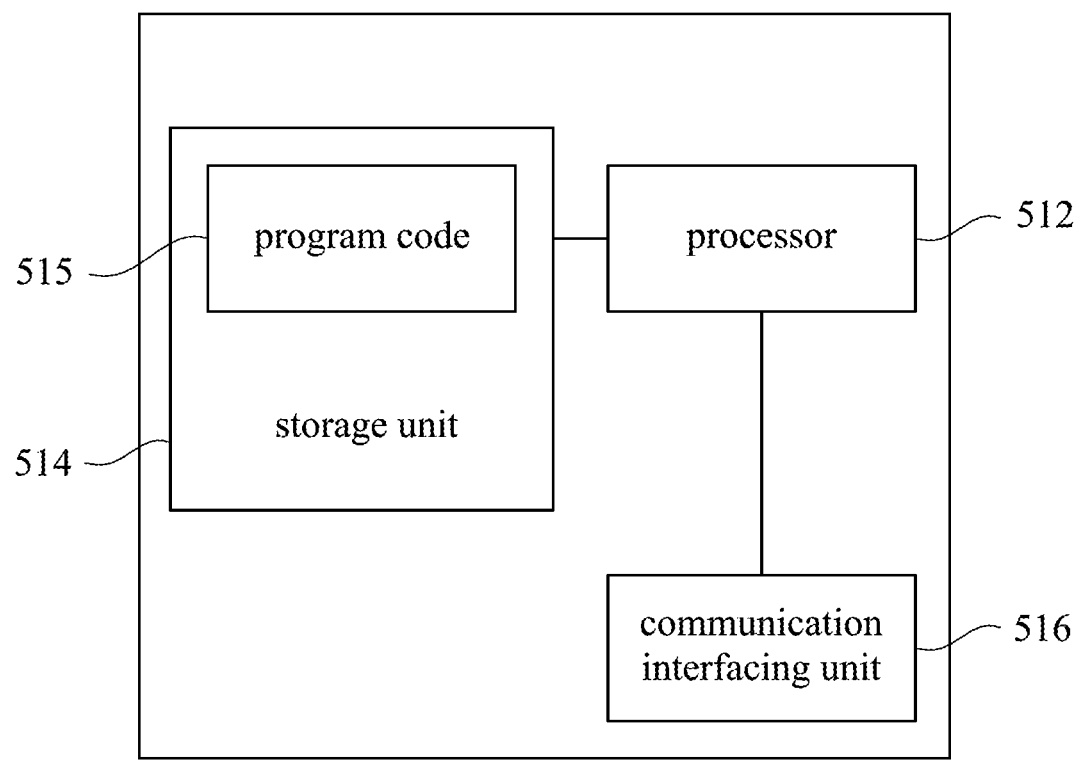
FIG. 6 is a schematic block diagram of a base station according to some embodiments of the present disclosure.

Reference is made to FIG. 6. FIG. 6 is a schematic block diagram of a base station 510 according to some embodiments of the present disclosure. The base station 510 may include a processor 512, a storage unit 514, and a communication interfacing unit 516. In some embodiments, the storage unit 514 stores a program code 515. The program code may be accessed by the processor 512 to perform several operations according to the program code 515 accessed. The communication interfacing unit 516 is configured to communicate with the communication device 530 according to the operation results of the processor 512. In some embodiments, the communication interfacing unit 516 may communicate with the communication device 530 by wireless signals.

Figure 7:
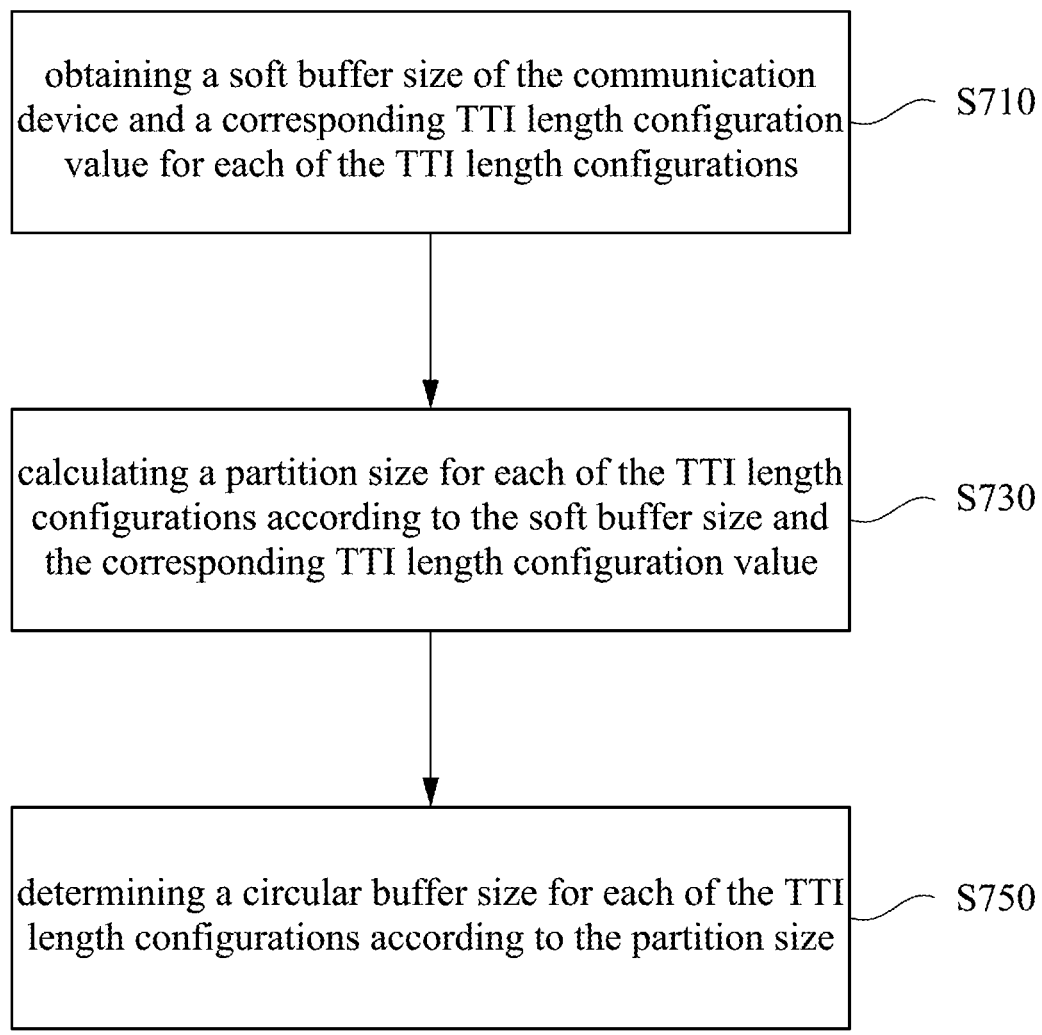
FIG. 7 is a flow chart of a communication method according to some embodiments of the present disclosure.

Reference is made to FIG. 7. FIG. 7 is a flow chart of a communication method 700 according to some embodiments of the present disclosure. The communication method 700 includes operations S710-S730. The operations S710-S730 may be performed by the processor 512 in FIG. 6.

S710: obtaining a soft buffer size of the communication device and a corresponding TTI length configuration value for each of the TTI length configurations;

S730: calculating a partition size for each of the TTI length configurations according to the soft buffer size and the corresponding TTI length configuration value; and S750: determining a circular buffer size for each of the TTI length configurations according to the partition size.

In operation S710, obtaining a soft buffer size of the communication device and a corresponding TTI length configuration value for each of the TTI length configurations. The base station 510 may obtain the soft buffer size Nsoft of the communication devices 530.

In operation S730, calculating a partition size for each of the TTI length configurations according to the soft buffer size and the corresponding TTI length configuration value. The sum of the partition sizes Nsoftp is equal to a soft buffer size of the at least one soft buffer Nsoft. The partition sizes Nsoftp are unequal among the TTI length configurations. In some embodiments, the partition sizes of the TTI length configurations are in a proportion to the TTI length configuration values respectively. The TTI length configuration value may be the HARQ process number, the maximum transport block size value, the physical resource block (PRB) value, or a combination thereof. The details of the calculation of the partition sizes Nsoftp may be as the above mentioned, and will not be repeated here.

In some embodiments, operation S730 further includes the following operations: for each of the TTI length configurations, calculating a corresponding proportion of the corresponding TTI length configuration value over a sum of the TTI length configuration values corresponding to the plurality of TTI length configuration; and calculating the partition size according to the corresponding proportion, such that each of the TTI length configurations corresponds to a corresponding partition size. The TTI length configuration value proportions are calculated according to the HARQ process numbers, the transport block size values, the physical resource block (PRB) values, or a combination thereof. The details of operation S730 may be as the above mentioned, and will not be repeated here.

In some embodiments, the processor 512 is further configured to partition the soft buffer partitions SBP among the codeblock values, the MIMO transport block values, and the HARQ process numbers. The codeblock values, the transport block values, and the HARQ process numbers correspond to the TTI length configurations.

For example, the soft buffer unit size Nir of the soft buffer unit when only a normal TTI and only a downlink carrier is configured may be as the following equation:

$$Nir = \left\lfloor \frac{Nsoft}{C \cdot KMIMO \cdot \min(MDLHARQ,\ Mlimit)} \right\rfloor.$$

Nir denotes the soft buffer unit size; Nsoft denotes the soft buffer size of the soft buffer; C denotes the codeblock value; KMIMO denotes MIMO transport block values; MDLHARQ denotes the HARQ process numbers; and Mlimit denotes a limit value.

For another example, the soft buffer unit size Nir of the soft buffer unit when a shortened TTI and a normal TTI are configured, and only a downlink carrier is configured, in which configuration 1 is the shortened TTI, and configuration 2 is the normal TTI, may be as the following equation:

$$Nir = \left\lfloor \frac{Nsoft}{C \cdot KMIMO \cdot \min(MDLHARQ,\ Mlimit)} \times \frac{Nsoftp(k)}{Nsoft} \right\rfloor.$$

Nir denotes the soft buffer unit size; Nsoft denotes the soft buffer size of the soft buffer; C denotes the codeblock value; KMIMO denotes MIMO transport block values; MDLHARQ denotes the HARQ process numbers; and Mlimit denotes a limit value; Nsoft denotes the soft buffer size of the soft buffer SB; k=1 or 2 depending on the TTI length configuration; and $$\frac{Nsoftp(k)}{Nsoft}$$

may be obtained as above-mentioned.

In operation S750, determining a circular buffer size for each of the TTI length configurations according to the partition size. In some embodiments, the processor 512 is further configured to encode a data into a encoded data and truncate the encoded data according to the size of the circular buffer, and store the truncated encoded data in the circular buffer. In some embodiments, the truncated encoded data may be transmitted to the communication device 530 and stored in the soft buffer SB of the communication device 530.

The base station 510 then determines the length of the circular buffer according to the size of the encoded data and the partition sizes Nsoftp of the soft buffer partitions SBP as derived above. If the encoded data size exceeds the corresponding partition size Nsoftp, the encoded data is truncated. The base station 510 then performs rate matching operation on the truncated data. Otherwise if the encoded data size does not exceed the corresponding partition size Nsoftp, the base station performs rate matching operation on the whole encoded data without truncation. In some embodiments, the remaining data that exceeds the partition size Nsoftp are discarded.

Note that a normal cyclic prefix (CP) in LTE systems has been assumed in the disclosure. The current disclosure may straightforwardly apply to a communication system with extended CP.

In some embodiments, the processor 132 and 512 may be a microprocessor or an Application Specific Integrated Circuit (ASIC), or other devices or circuits with the function of calculating, processing, information receiving/sending or other similar functions. In some embodiments, the storage unit 134 and 514 may be a subscriber identity module (SIM), read-only memory (ROM), flash memory, random-access memory (RAM), hard disk, optical data storage device, or other devices or circuits with the function of data storing or other similar functions.

According to the embodiments of the present disclosure, it is understood that the embodiment of the present disclosure is to provide a communication device and a base station, and in particular, a communication device and a base station for partitioning a soft buffer unequally among the different transmission time interval (TTI) length configurations, in order to reduce the cost.

Although the present invention has been described in considerable detail with reference to certain embodiments thereof, other embodiments are possible. Therefore, the scope of the appended claims should not be limited to the description of the embodiments contained herein.

What is claimed is:

1. A communication device configured to communicate with a network via at least one carrier, wherein the at least one carrier comprises a plurality of transmission time interval (TTI) length configurations, wherein the communication device comprises:
    a soft buffer circuit for storing a downlink data transmission from the network;
    a storage circuit configured to store a program code; and
    a processor electrically coupled to the storage circuit, wherein the processor is configured to access the program code to partition the soft buffer circuit into a plurality of soft buffer partitions among the TTI length configurations according to a plurality of HARQ process numbers corresponding to the TTI length configurations;
    wherein partitioning the soft buffer circuit of the communication device into soft buffer partitions comprises:
    for each of the TTI length configurations, calculating a corresponding proportion of a corresponding HARQ process number over a sum of the plurality of HARQ process numbers; and
    partitioning the soft buffer circuit according to the corresponding proportion, such that each of the TTI length configurations corresponds to a corresponding soft buffer partition;
    wherein for each of the TTI length configurations, the processor is further configured to partition the corresponding soft buffer partition equally among a plurality of corresponding codeblock values, and/or a plurality of corresponding MIMO transport block values.

2. The communication device of claim 1, wherein a soft buffer size of the soft buffer circuit is equal to a sum of a plurality of partition sizes of the soft buffer partitions.

3. The communication device of claim 1, wherein for each of the TTI length configurations, the processor is further configured to partition the corresponding soft buffer partition equally among the corresponding HARQ process number.

4. A communication device configured to communicate with a network via at least one carrier, wherein the at least one carrier comprises a plurality of transmission time interval (TTI) length configurations, wherein the communication device comprises:
    a soft buffer circuit for storing a downlink data transmission from the network;
    a storage circuit configured to store a program code; and
    a processor electrically coupled to the storage circuit, wherein the processor is configured to access the program code to partition the soft buffer circuit into a plurality of soft buffer partitions among the TTI length configurations according to a plurality of physical resource block (PRB) values corresponding to the TTI length configurations;
    wherein partitioning the soft buffer circuit of the communication device into soft buffer partitions comprises:
    for each of the TTI length configurations, calculating a corresponding proportion of a corresponding PRB value over a sum of the plurality of PRB values; and
    partitioning the soft buffer circuit according to the corresponding proportion, such that each of the TTI length configurations corresponds to a corresponding soft buffer partition;
    wherein for each of the TTI length configurations, the processor is further configured to partition the corresponding soft buffer partition equally among a plurality of corresponding codeblock values, and/or a plurality of corresponding MIMO transport block values, and/or a plurality of corresponding HARQ process numbers.

5. The communication device of claim 4, wherein a soft buffer size of the soft buffer circuit is equal to a sum of a plurality of partition sizes of the soft buffer partitions.

6. A communication device configured to communicate with a network via at least one carrier, wherein the at least one carrier comprises a plurality of transmission time interval (TTI) length configurations, wherein the communication device comprises:
    a soft buffer circuit for storing a downlink data transmission from the network;
    a storage circuit configured to store a program code; and
    a processor electrically coupled to the storage circuit, wherein the processor is configured to access the program code to partition the soft buffer circuit into a plurality of soft buffer partitions among the TTI length configurations according to a plurality of maximum transport block size (TBS) values corresponding to the TTI length configurations;
    wherein partitioning the soft buffer circuit of the communication device into soft buffer partitions comprises:
    for each of the TTI length configurations, calculating a corresponding proportion of a corresponding maximum transport block size (TBS) value over a sum of the plurality of maximum transport block size (TBS) values; and
    partitioning the soft buffer circuit according to the corresponding proportion, such that each of the TTI length configurations corresponds to a corresponding soft buffer partition;

wherein for each of the TTI length configurations, the processor is further configured to partition the corresponding soft buffer partition equally among a plurality of corresponding codeblock values, and/or a plurality of corresponding MIMO transport block values, and/or a plurality of corresponding HARQ process numbers.

7. The communication device of claim 6, wherein a soft buffer size of the soft buffer circuit is equal to a sum of a plurality of partition sizes of the soft buffer partitions.

8. A base station configured to communicate with a communication device via at least one carrier, wherein the communication device comprising a soft buffer circuit, wherein the at least one carrier comprises a plurality of transmission time interval (TTI) length configurations, wherein the base station comprises:
   a storage circuit configured to store a program code; and
   a processor electrically coupled to the storage circuit, wherein the processor is configured to access the program code to obtain a soft buffer size of the communication device and a corresponding TTI length configuration value for each of the TTI length configurations, calculate a partition size for each of the TTI length configurations according to the soft buffer size and the corresponding TTI length configuration value, and determine a circular buffer size for each of the TTI length configurations according to the partition size;
   wherein calculating the partition size comprises:
   for each of the TTI length configurations, calculating a corresponding proportion of the corresponding TTI length configuration value over a sum of the TTI length configuration values corresponding to the plurality of TTI length configuration; and
   calculating the partition size according to the corresponding proportion, such that each of the TTI length configurations corresponds to a corresponding partition size;
   wherein for each of the TTI length configurations, the processor is further configured to partition the corresponding partition size equally among a plurality of corresponding codeblock values, and/or a plurality of corresponding MIMO transport block values, and/or a plurality of corresponding HARQ process numbers, and/or a plurality of corresponding codeblock values.

9. The base station of claim 8, wherein a sum of the partition sizes is equal to a soft buffer size of the soft buffer circuit.

10. The base station of claim 8, wherein the corresponding TTI length configuration value comprises a HARQ process number, a maximum transport block size (TBS) value, a physical resource block (PRB) value, or a combination thereof.

11. The base station of claim 8, wherein the processor is further configured to encode a data into an encoded data, and truncate the encoded data according to the size of the circular buffer, and store the truncated encoded data in the circular buffer.

* * * * *